United States Patent
Mittal et al.

(10) Patent No.: US 10,503,222 B2
(45) Date of Patent: Dec. 10, 2019

(54) CIRCUITS AND METHODS PROVIDING TEMPERATURE MITIGATION FOR COMPUTING DEVICES USING ESTIMATED SKIN TEMPERATURE

(71) Applicant: QUALCOMM Incorporated, San Diego, CA (US)

(72) Inventors: Arpit Mittal, San Diego, CA (US); Mehdi Saeidi, San Diego, CA (US); Farsheed Mahmoudi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 601 days.

(21) Appl. No.: 14/860,203

(22) Filed: Sep. 21, 2015

(65) Prior Publication Data

US 2017/0083064 A1 Mar. 23, 2017

(51) Int. Cl.
| | |
|---|---|
| *G06F 1/20* | (2006.01) |
| *G05B 15/02* | (2006.01) |
| *G06F 1/3206* | (2019.01) |
| *G06F 1/324* | (2019.01) |
| *G06F 1/3296* | (2019.01) |

(52) U.S. Cl.
CPC ............ *G06F 1/206* (2013.01); *G05B 15/02* (2013.01); *G06F 1/324* (2013.01); *G06F 1/3206* (2013.01); *G06F 1/3296* (2013.01); *Y02D 10/126* (2018.01); *Y02D 10/172* (2018.01)

(58) Field of Classification Search
CPC ........ G06F 1/206; G06F 1/3206; G06F 1/324; G05B 15/02

USPC ......................................................... 700/299
See application file for complete search history.

(56) References Cited

U.S. PATENT DOCUMENTS

| | | | |
|---|---|---|---|
| 5,940,786 A | 8/1999 | Steeby | |
| 6,677,821 B2 * | 1/2004 | Kusunoki | H03F 1/3247 330/107 |
| 8,452,463 B2 | 5/2013 | Cox et al. | |
| 8,988,115 B2 | 3/2015 | Kim et al. | |
| 2008/0028778 A1 | 2/2008 | Millet | |
| 2010/0094582 A1 | 4/2010 | Cox et al. | |
| 2013/0091348 A1 | 4/2013 | Kwon et al. | |
| 2013/0321041 A1 * | 12/2013 | Kim | H03K 3/011 327/113 |

(Continued)

OTHER PUBLICATIONS

International Search Report and Written Opinion—PCT/US2016/050576—ISA/EPO6—dated Nov. 18, 2016.

*Primary Examiner* — Anthan Tran
(74) *Attorney, Agent, or Firm* — Haynes and Boone, LLP

(57) ABSTRACT

A method for temperature mitigation includes receiving a signal from a temperature sensor that is disposed within a computing device. A processor chip within the computing device produces heat. The signal from the temperature sensor is converted to temperature data. The method further includes processing the temperature data to generate an estimate of a temperature of an external surface of the device. The processing includes applying a low pass filter to the temperature data, applying an amplitude attenuation to the temperature data, and applying a delay to the temperature data. The method further includes reducing an operating parameter of the processor chip, such as operating frequency, in response to the estimated temperature of the external surface of the device.

25 Claims, 6 Drawing Sheets

(56) References Cited

U.S. PATENT DOCUMENTS

| | | |
|---|---|---|
| 2014/0132334 A1 | 5/2014 | Park |
| 2014/0188303 A1* | 7/2014 | Fujiwara ............ G05D 23/1919 |
| | | 700/300 |
| 2014/0249690 A1 | 9/2014 | Park |
| 2014/0324245 A1 | 10/2014 | Kwon et al. |
| 2015/0057830 A1 | 2/2015 | Slaby et al. |
| 2016/0048181 A1* | 2/2016 | Rosenzweig ........... G06F 1/206 |
| | | 713/322 |

* cited by examiner

CIRCUITS AND METHODS PROVIDING TEMPERATURE MITIGATION FOR COMPUTING DEVICES USING ESTIMATED SKIN TEMPERATURE

TECHNICAL FIELD

This application relates to thermal mitigation and, more specifically, to providing thermal mitigation to a computing device by estimating a device skin temperature.

BACKGROUND

A conventional modern smart phone may include a system on chip (SOC), which has a processor and other operational circuits. Specifically, an SOC in a smart phone may include a processor chip within a package, where the package is mounted on a printed circuit board (PCB) internally to the phone. The phone includes an external housing and a display, such as a liquid crystal display (LCD). A human user when using the phone physically touches the external housing and the display.

As the SOC operates, it generates heat. In one example, the SOC within a smart phone may reach temperatures of 80° C.-100° C. Furthermore, conventional smart phones do not include fans to dissipate heat. During use, such as when a human user is watching a video on a smart phone, the SOC generates heat, and the heat is spread through the internal portions of the phone to the outside surface of the phone.

The outside surface of the phone is sometimes referred to as the "skin." The outside surface includes the part of the external housing that is physically on the outside of the phone as well as any other externally-exposed portions, such as an LCD display. It is generally accepted that the skin of the phone should not reach temperatures higher than about 40° C.-45° C. due to safety and ergonomic reasons. As noted above, the SOC within the smart phone may reach temperatures of 80° C.-100° C., although the temperature of the SOC is not felt directly at the skin of the phone. Instead, heat dissipation within the phone often means that the skin temperature of the phone is at a lower temperature than the SOC temperature. Furthermore, whereas changes to SOC temperature may be relatively quick (e.g., seconds), changes to device skin temperature may be relatively slow (e.g., tens of seconds or minutes).

Conventional smart phones include algorithms to control the skin temperature by reducing a frequency of operation of the SOC when a temperature sensor in the SOC reaches a threshold level. However, SOC temperature can be a poor proxy for device skin temperature.

SUMMARY

Various embodiments include systems and methods that mitigate temperature by measuring temperature within the computing device, estimating an external surface temperature of the device, and reducing performance of a processor, if appropriate, based at least in part on the temperature estimate.

In one embodiment, a method for mitigating temperature of a device includes receiving a signal from a temperature sensor, wherein the temperature sensor is disposed within the device having a processor chip that produces heat within the device. The method also includes generating temperature data from the signal and processing the temperature data to generate data indicative of a temperature of an external surface of the device. Processing the temperature data includes applying a low pass filter, an amplitude attenuation, and a delay to the digital temperature data. The method also includes reducing an operating parameter of the processor chip in response to the data indicative of the temperature of the external surface.

In another embodiment, a computer program product having a computer readable medium tangibly recording computer program logic for mitigating temperature of a device includes: code to receive a signal from a temperature sensor, wherein the temperature sensor is disposed within the device having a processor chip that produces heat within the device, code to generate temperature data from the signal, code to apply a low pass filter, an amplitude attenuation, and a delay to the temperature data to generate data indicative of a temperature of an external surface of the device; and code to reduce an operating parameter of the processor chip in response to the data indicative of the temperature of the external surface of the device.

In another embodiment, a system for mitigating temperature includes a processor, a housing configured to enclose at least a portion of the system, the processor being disposed within the system so that it is enclosed within the housing and being in indirect thermal contact with the housing. The system also includes a temperature sensing device disposed within the housing and being in electrical communication with the processor. The processor is configured to perform the following operation: generate first temperature data indicative of a temperature experienced by the temperature sensing device; estimate a temperature of an external surface of the housing by generating second temperature data, wherein generating second temperature data includes applying a transfer function to the first temperature data, the transfer function including a low pass filter, amplitude attenuation, and delay; and reduce an operating parameter of the processor in response to the second temperature data.

In yet another embodiment, a method for temperature mitigation includes receiving temperature data of an internal component of an enclosed computing device, estimating a temperature of an external surface of the computing device by applying attenuation, filtering, and delay to the temperature data of the internal component. The method further includes comparing an estimation of the temperature of the external surface of the computing device to a programmed threshold, wherein the program threshold corresponds to a temperature limit of the external surface of the computing device, reducing an operating parameter of the computer processor of the computing device in response to the comparing, and subsequently increasing the operating parameter of the computer processor in response to determining that the estimation of the temperature of the external surface of the computing device has decreased.

DETAILED DESCRIPTION

Figure 1:
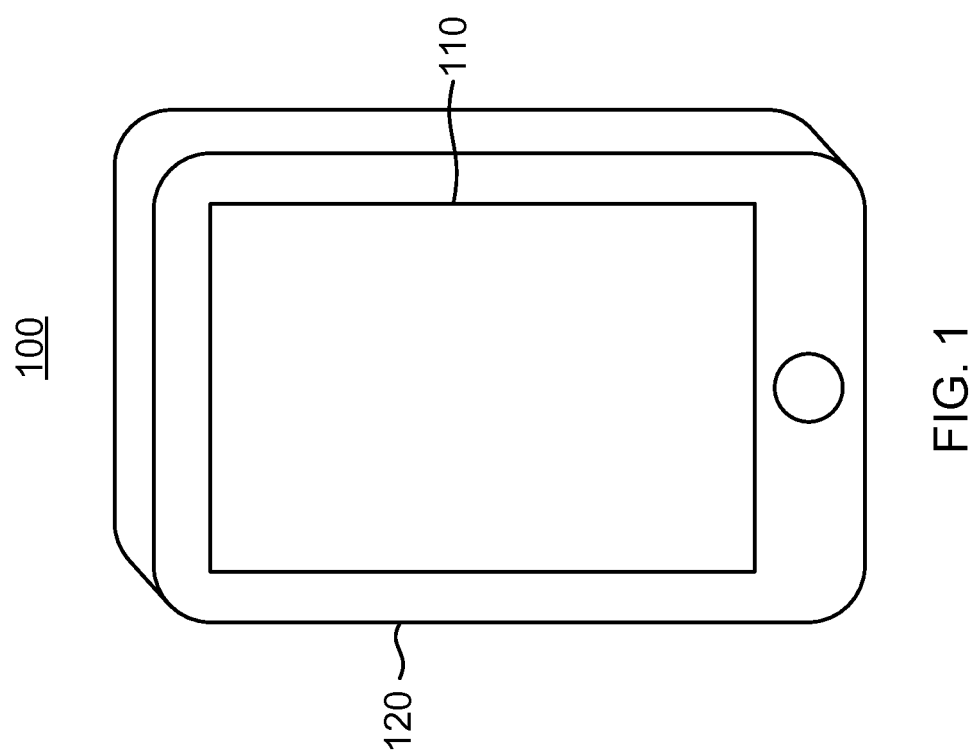
FIG. 1 is an illustration of an example computing device that may perform a method according to various embodiments.

Various embodiments include systems and methods to estimate device skin temperature by applying a transfer function to temperature sensor data. The temperature sensor data may come from a temperature sensor located either on-chip, on-package, or on a printed circuit board of the device. In other words, the temperature sensor does not directly measure device skin temperature. The embodiments also include applying a skin temperature mitigation algorithm based on the estimated device skin temperature.

One example method may be performed by, for example any suitable hardware or software processing logic. For instance, a smartphone may include a system on chip (SOC), and the skin temperature mitigation process may be performed by functionality within the software kernel of the SOC. Alternatively, such functionality may be built into hardware in the SOC. In any event, the processing functionality may include computer-readable code that is executed by the SOC.

Continuing with the example method, the processing logic reads data from a temperature sensor and compares the temperature reading to a threshold temperature. The threshold temperature may be set at a value at which it is expected that the device skin temperature may be nearing an uncomfortable or dangerous temperature, thereby beginning monitoring. The threshold temperature may be device-dependent and may be determined by experimentation or known design properties. If the temperature reading is below the threshold temperature, then the system continues to take more temperature readings.

However, if the temperature reading is above the threshold temperature, then the process estimates a device skin temperature. Estimating the skin temperature may include digitizing the temperature reading and applying a transfer function to the digitized temperature reading. The transfer function may include various types of signal conditioning expected to provide a useful indicator of the skin temperature.

In one example embodiment, the transfer function includes a low pass filter, amplitude attenuation, and delay. The low pass filter removes higher-frequency variations in temperature (e.g., in the range of seconds or less) because the skin temperature would be expected to change more slowly than temperatures inside the device or near the SOC. Amplitude attenuation multiplies the magnitude of the temperature by a factor that is less than one, thereby decreasing the amplitude of the temperature signal. Amplitude attenuation takes into account that the skin temperature of the device will usually be expected to be lower than a temperature inside the device close to the SOC. The transfer function may also include a delay component. The delay accounts for the expected elapsed time between when heat is produced within the device and when that heat affects the skin temperature. For instance, in some devices it may take one or two minutes for heat produced inside the device to affect the skin temperature. The properties of the low pass filter, the amplitude attenuation, and the delay are device-dependent and may be determined through experimentation and/or known properties from the device design.

The processing logic produces a skin temperature estimation by use of the transfer function. The processing logic compares the temperature estimation to a temperature threshold, which is a device skin temperature threshold value that corresponds to device mitigation. This temperature threshold may be the same as or different from the temperature threshold described above, which triggers the calculation of temperature estimation. In some examples, a temperature estimation above 40° C. would make device mitigation desirable, though the scope of embodiments includes any appropriate threshold value. If the temperature estimation is not greater than the threshold, the temperature mitigation algorithm does not reduce an operating parameter of the device and simply reads another temperature measurement value.

However, if the temperature estimation is greater than the temperature threshold, then the process reduces an operating parameter of the device to generate less heat. In one example, the processing logic reduces an operating frequency of one or more cores in the SOC, thereby reducing power consumption. However, the scope of embodiments may include any appropriate thermal mitigation technique, such as putting cores in an idle state. The process continues to operate as the SOC operates, continually measuring the temperature and taking appropriate mitigation steps, as described more fully with respect to the embodiments of FIGS. 1-6.

FIG. 1 is a simplified diagram illustrating an example computing device 100 in which various embodiments may be implemented. In the example of FIG. 1, computing device 100 is shown as a smart phone. However, the scope of embodiments is not limited to a smart phone, as other embodiments may include a tablet computer, a laptop computer, or other appropriate device. In fact, the scope of embodiments includes any particular computing device, whether mobile or not. Embodiments including battery-powered devices, such as tablet computers and smart phones may benefit from the concepts disclosed herein. Specifically, the concepts described herein provide techniques to reduce heat that is dissipated outside of computing device 100, thereby providing comfort for a human user and conserving battery power.

As shown in FIG. 1, computing device 100 includes an outer surface or skin 120, which may be expected to come into contact with hands or other parts of the body of a human user. The outside surface 120 includes, e.g., metal surfaces and plastic surfaces and the surfaces that make up display unit 110. In one example, display unit 110 is a capacitive liquid crystal display (LCD) touchscreen, so that the surface of display unit 110 is either glass or plastic-coated glass. The outside surface 120 therefore includes the various external surfaces such as the display unit 110 and the other parts of the external housing. Although not shown in the vantage point of FIG. 1, the back side of computing device 100 includes another part of the outer surface of the device, and specifically another part of the exterior housing, which may be arranged in a plane parallel to a plane of display unit 110.

FIG. 1 does not show a computer processor, but it is understood that a computer processor is included within computing device 100. In one example, the computer processor is implemented in a system on chip (SOC) within a package, and the package is mounted to a printed circuit board and disposed within the physical housing. In conventional smart phones, the package including the processor is mounted in a plane parallel to a plane of the display surface and a plane of the back surface. Examples of packages and printed circuit boards are discussed in more detail with respect to FIG. 2.

As a computer processor operates, it produces heat, which dissipates throughout the physical structure of computing device 100. Depending on the specific heat properties of computing device 100, heat from the operation of the processor may reach uncomfortable or near-uncomfortable temperatures on the outside surface 120 of computing device 100. The computer processor within computing device 100 provides functionality to control the heat felt on the outside surface 120 of the computing device 100 by measuring temperature readings at one or more temperature sensors and adjusting a frequency and/or voltage of the processor if appropriate. An example method for thermal mitigation is described in more detail with respect to FIG. 6.

Figure 2:
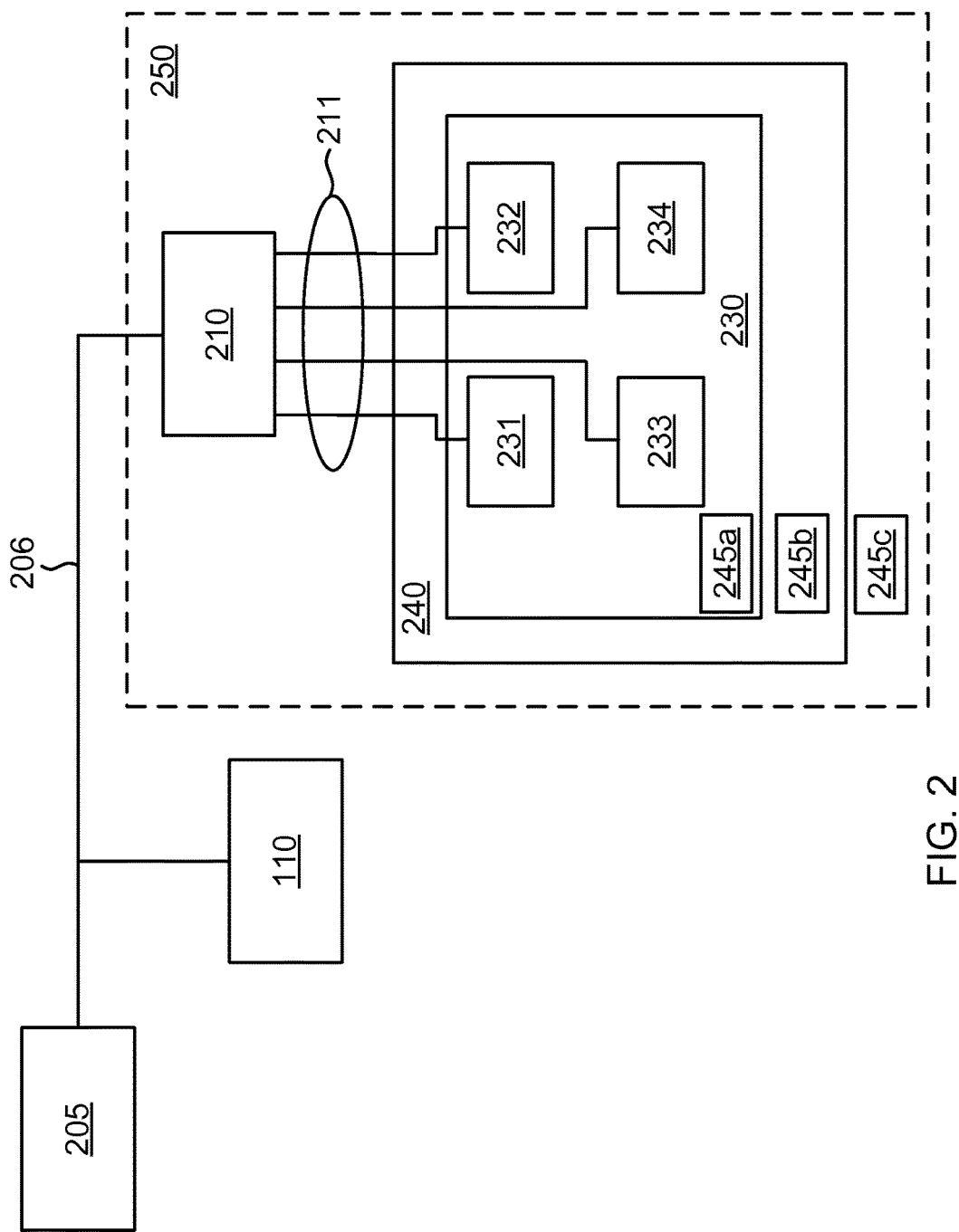
FIG. 2 is an illustration of the internal functional units of the computing device of FIG. 1, according to one embodiment.

FIG. 2 is an architectural diagram of an example physical layout of the internal functional components of computing device 100 of FIG. 1, according to one embodiment. FIG. 2 is intended to be illustrative, and it omits some features for ease of illustration.

Battery 205, power management integrated circuit 210, printed circuit board 250, and SOC 230 are disposed within the computing device 100 so that they are enclosed within the physical housing of the computing device 100 as indicated by exterior surface 120. Furthermore, SOC 230 is included within package 240. Package 240 and power management integrated circuit (PMIC) 210 are mounted to printed circuit board 250. In some examples, the printed circuit board 250 is disposed within computing device 100 so that it is in a plane parallel to a plane of display 110 and a back surface of the device 100.

Battery 205, PMIC 210, and SOC 230 are also in thermal contact with the physical housing so that the heat generated by those items is conducted to the exterior surface 120 of the device 100. Heat generated by SOC 230 is conducted to the exterior surface 120 of the device 100 through package 240 and, to some extent, through printed circuit board 250 as well.

Computing device 100 includes battery 205, which may be any appropriate battery now known or later developed. For instance, battery 205 may include a lithium-ion battery or other power source. Battery 205 is coupled to battery rail 206, which distributes power from the battery 205. Battery rail 206 is coupled to device display 110 and to PMIC 210. In some embodiments, the power from battery rail 206 may be regulated or otherwise conditioned before being provided to display 110, however for ease of illustration, battery rail 206 in this example is provided directly to display 110.

PMIC 210 receives power from battery rail 206 and regulates the voltage to provide an output voltage that is usable by SOC 230. SOC 230 has four cores, 231-234. Examples of cores include a central processing unit (CPU), a graphics processing unit (GPU), a modem, and the like. Although not shown in FIG. 2, a clocking circuit provides a clock signal with an operating frequency to each of the cores 231-234, where the clocking circuit may be controlled to increase or decrease the operating frequency. In some examples, thermal mitigation may be performed by reducing an operating frequency of the cores 231-234 by performing the method of FIG. 6.

PMIC 210 provides power to SOC 230, and specifically provides power to the cores 231-234 by four separate power rails 211 in this embodiment. The scope of embodiments is not limited to any particular SOC architecture, as any appropriate number of cores and PMIC power rails may be used in a particular embodiment. For instance, other embodiments may include 16 cores, 32 cores, or other number.

The example embodiment of FIG. 2 shows three temperature sensors 245a-c. Specifically, temperature sensor 245a is located on-die and is physically disposed within SOC 230. Temperature sensor 245b is located off-die and in-package so that it is disposed within the materials (e.g., dielectric substrate layers) of package 240. Temperature sensor 245c is disposed outside of SOC 230 and package 240 and disposed upon printed circuit board 250.

Various embodiments may place temperature sensors, such as temperature sensors 245, at any appropriate position within computing device 100. It is noted that in various embodiments practical constraints may restrict the ability to dispose a temperature sensor directly on outside surface 120. Accordingly, the embodiment of FIG. 2 places one or more temperature sensors 245 within the housing of computing device 100. Each of the temperature sensors 245 is in indirect thermal contact with the external surface 120 of the device and is physically separate from the external surface 120 of the device. Accordingly, each of the temperature sensors 245 does not directly, physically contact the external surface 120 of the device, but each of the temperature sensors 245 and the external surface 120 are exposed to heat generated by SOC 230. The temperature sensors 245 provide information indicating a temperature internal to the enclosed computing device 100. While FIG. 2 shows three different temperature sensors, various embodiments may employ more or fewer temperature sensors.

Figure 6:
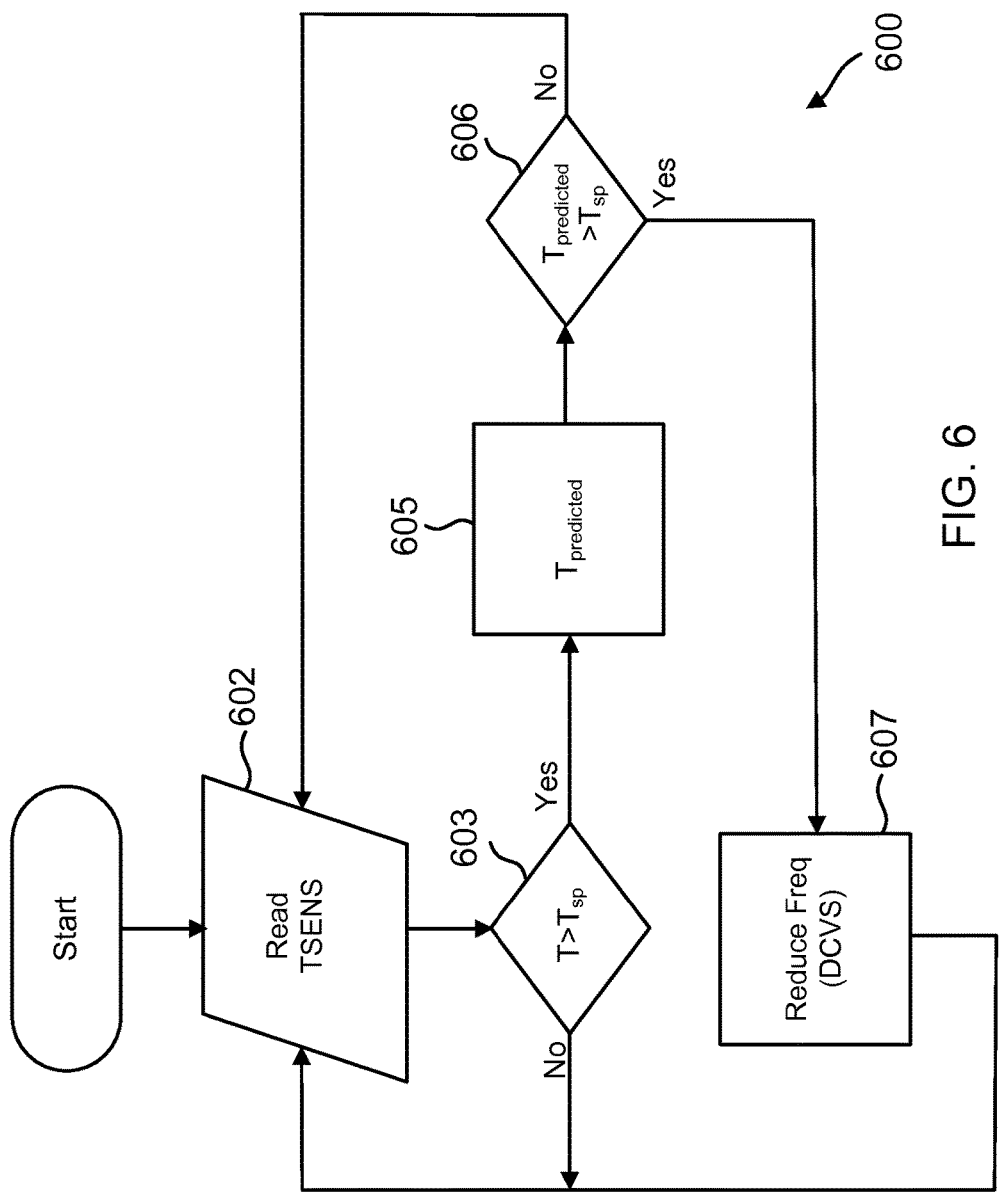
FIG. 6 is an illustration of a flow diagram of an example method of thermal mitigation, according to one embodiment.

SOC 230 includes functionality to measure temperature using one or more temperature sensors 245 and to keep an outside surface of the device within a defined temperature band by mitigating performance of SOC 230 based on temperature measurements from the one or more temperature sensors 245. An example method is shown in FIG. 6, and an example architecture is shown in FIG. 3.

Figure 3:
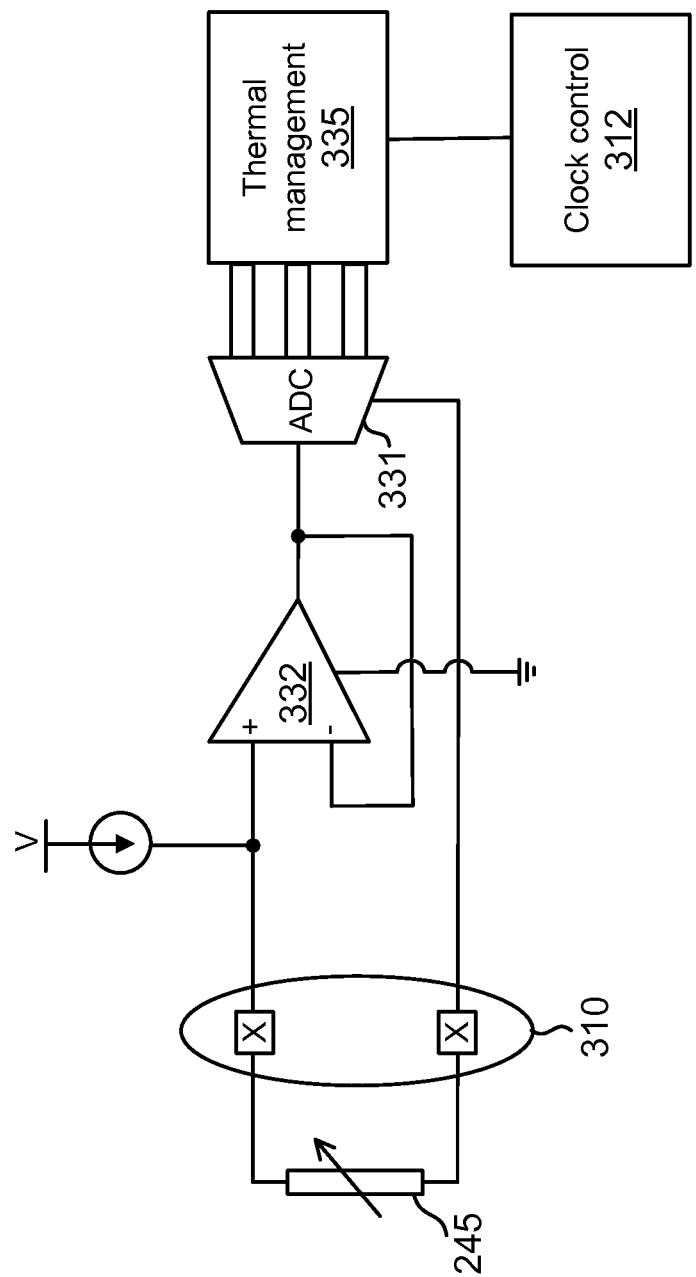
FIG. 3 is an illustration of thermal management circuitry and logic, according to one embodiment.

FIG. 3 provides an illustration of an example system that performs the methods described herein. The system of FIG. 3 includes temperature sensor 245, which in this embodiment is shown as a thermistor. A thermistor changes its resistance according to temperature, and the relationship between temperature and resistance is usually non-linear. However, a given thermistor has a known temperature-resistance relationship.

Temperature sensor 245 is in electrical communication with other circuitry through use of conductive contacts 310. For instance, in an example where temperature sensor 245 is located off-die but in-package, conductive contacts 310 represent conductive beads that facilitate electrical communication between SOC 230 and the metal layers of package 240. In another example where temperature sensor 245 is located outside of the package and on the printed circuit board 250, contacts 310 represent solder balls that facilitate electrical communication between the metal layers of package 240 and conductive traces on printed circuit board 250. In an embodiment wherein temperature sensor 245 is built on the semiconductor material of SOC 230, conductive contacts 310 may be omitted in favor of metal wires or other conductive portions. However, in each of the embodiments described above, temperature sensor 245 is in communication with on-chip circuitry that provides the processing logic for thermal mitigation.

On-chip circuitry in this example includes circuits and logic that are implemented within SOC 230 (FIG. 2). The on-chip circuitry includes operational amplifier 332, which has a non-inverting input (+) and an inverting input (−). The non-inverting input is in communication with temperature sensor 245. Operational amplifier 332 includes negative feedback, so that the output terminal is coupled to the inverting input. This arrangement smoothes out the voltage reading. Voltage at the non-inverting input is indicative of a temperature experienced by temperature sensor 245. Therefore, the output terminal of operational amplifier 332 provides an analog signal that is indicative of the temperature experienced by sensor 245.

The analog output signal from operational amplifier 332 is received by analog to digital converter (ADC) 331, and ADC 331 produces a digital signal indicative of the temperature information received from operational amplifier 332. ADC 331 passes the digital signal to thermal management unit 335 for further processing. Thermal management unit 335 in one example includes hardware logic to provide thermal management services to SOC 230.

In another embodiment, thermal management unit 335 represents thermal management processes that are provided by a software kernel of the SOC 230. For instance, SOC 230 may include a software kernel, which operates when SOC 230 is powered up and receiving a clock signal. Thermal management unit 335 may in that instance include a software process that is built into kernel 330 to perform the method described with respect to FIG. 6. However, either hardware or software or a combination thereof may perform the processes described herein to provide thermal management.

Thermal management unit 335 receives the digital signal from ADC 331, and the digital signal includes data indicative of a temperature measured by sensor 245. Thermal management unit 335 includes at least one programmed temperature threshold set at a value at which it is expected that the device skin temperature may be nearing an uncomfortable or dangerous temperature. Thermal management unit 335 receives the digital signal from ADC 331 and compares temperature information of that digital signal to the programmed temperature threshold. If the temperature is below the temperature threshold, then thermal management unit 335 may simply continue monitoring on a periodic basis or at other appropriate times.

On the other hand, if the temperature information of the digital signal indicates a temperature higher than the temperature threshold, then thermal management unit 335 may determine to calculate an estimated skin temperature for the device. Calculating an estimated skin temperature is described in more detail with respect to FIGS. 4-6. Thermal management unit 335 then compares the estimated skin temperature to either the same temperature threshold or a different temperature threshold to determine whether to reduce an operating parameter of the SOC 230. Specifically, if the estimated skin temperature is below the temperature threshold, then thermal management unit 335 may take no mitigating action and may return to simply monitoring the digital signal against the temperature threshold. However, if the estimated skin temperature is above the temperature threshold, then thermal management unit 335 may then begin to reduce an operating parameter of the SOC 230.

Thermal management unit 335 may reduce an operating parameter of SOC 230 in response to determining that the estimated skin temperature has exceeded the threshold. Examples of reducing an operating parameter include reducing a voltage and/or a frequency of operation of SOC 230. The example of FIG. 3 assumes that the process includes at least reducing an operating frequency of SOC 230.

Thermal management unit 335 may reduce the clock frequencies provided to the cores or increase the clock frequencies provided to the cores by sending commands to clock control unit 312. Clock control unit 312 may be physically a part of SOC 230 or separate therefrom, as the scope of embodiments is not limited to any particular clocking architecture. Clock control unit 312 may control for instance a phase locked loop (PLL) or other appropriate circuit that provides a periodic clock signal in order to raise or lower the operating frequency of one or more of the cores 231-234.

In one example, when thermal management circuit 335 compares the estimated skin temperature to the temperature threshold then determines that it is appropriate to lower a frequency of operation, thermal management unit 335 sends a control signal to clock control unit 312 instructing clock control unit 312 to reduce the frequency of operation. Furthermore, thermal management circuit 335 may continue to monitor the temperature data from the digital signal, generate subsequent skin temperature estimations, and compare those skin temperature estimations to either the same or a different threshold, and when the skin temperature estimation drops below either the same or a different threshold, thermal management circuit 335 may increase the frequency of operation by sending another control signal to clock control unit 312.

The temperature threshold (or thresholds) that are used by thermal management unit 335 may depend upon the particular thermal conductive properties of a given device. Furthermore, the specific transfer function that is used to estimate the device skin temperature from the temperature measurement may depend on the particular thermal conductive properties of the device as well.

A given device, such as computing device 100 of FIG. 1, is made of various physical materials that cause the device to have particular thermal conductive properties. For instance, some computing devices may include a specially designed heat spreader that is internal to the housing and placed between an inside surface of the housing and the computer processor within the device. A well-functioning heat spreader may keep the heat that is generated by the SOC from being concentrated at one area of the housing, thereby maintaining a more uniform heat profile around the surface of the computing device. Since the heat is spread to more surface area, the heat may be removed by ambient air more efficiently, thereby allowing more heat generation by the SOC before thermal mitigation becomes appropriate.

In an example device that has a well-functioning heat spreader, it is expected that the estimated skin temperature would be lower than a temperature measured by a temperature sensor 245 either on-die, in-package, or on the printed circuit board. In fact, fluctuations in the measured temperature may be smoothed out and delayed significantly before they are felt on the skin of the device. Accordingly, for a given device the appropriate thresholds and the specific transfer function to calculate the device skin temperature would take into account the presence of such heat spreader.

On the other hand, some computing devices may have different levels of heat spreading, such that heat from the SOC is conducted from the SOC less evenly. Therefore, the heat is concentrated to specific areas of the skin of the device. Such areas may become heated more quickly, and the heat may be removed from the surface by ambient air less efficiently since less surface area is heated. Therefore, the appropriate thresholds and specific transfer functions for such devices would take these thermal properties into account.

Each model of computing device has its own thermal properties. Therefore, a thermal algorithm that is designed specifically for a particular model of computing device may not work well for different models of computing devices. In the example above, thermal management unit 335 compares temperature data of the digital signal to a programmed threshold. The threshold temperature may be set at a value at which it is expected that the device skin temperature may be nearing an uncomfortable or dangerous temperature or will reach an uncomfortable or dangerous temperature within seconds or minutes unless mitigation is performed. Of course, an uncomfortable level for the device skin may be defined by engineers to be 40° C.-45° C. or other appropriate temperature level. Furthermore, the threshold may be different for different device models and types. Also, the transfer function that is used to calculate the estimated skin temperature may be different for different device models and types. As explained above, the thermal conductive properties of a particular device depends upon the physical makeup and arrangement of the materials of the device.

Figure 4:
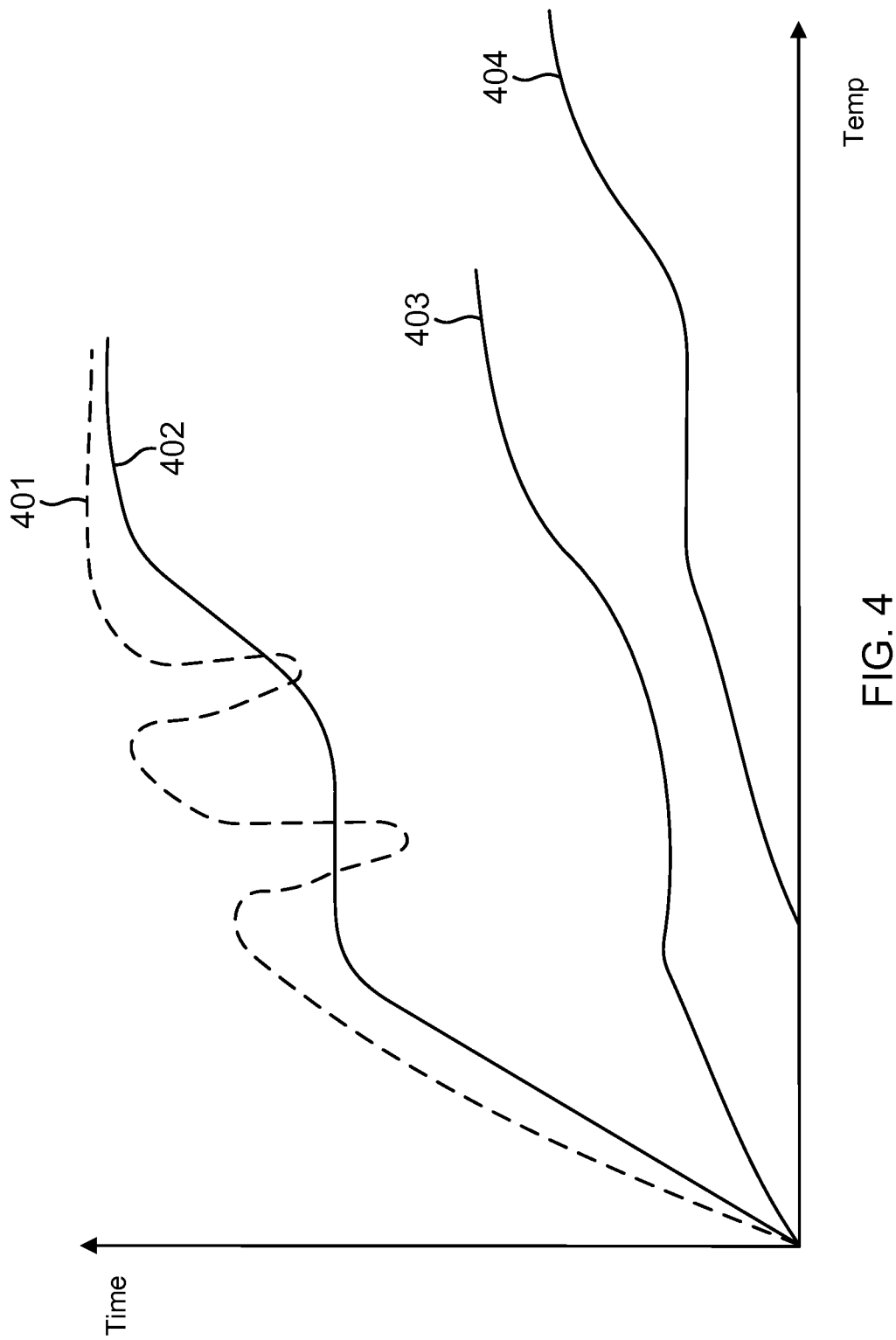
FIG. 4 is an illustration of example temperature curves, according to one embodiment.
Figure 5:
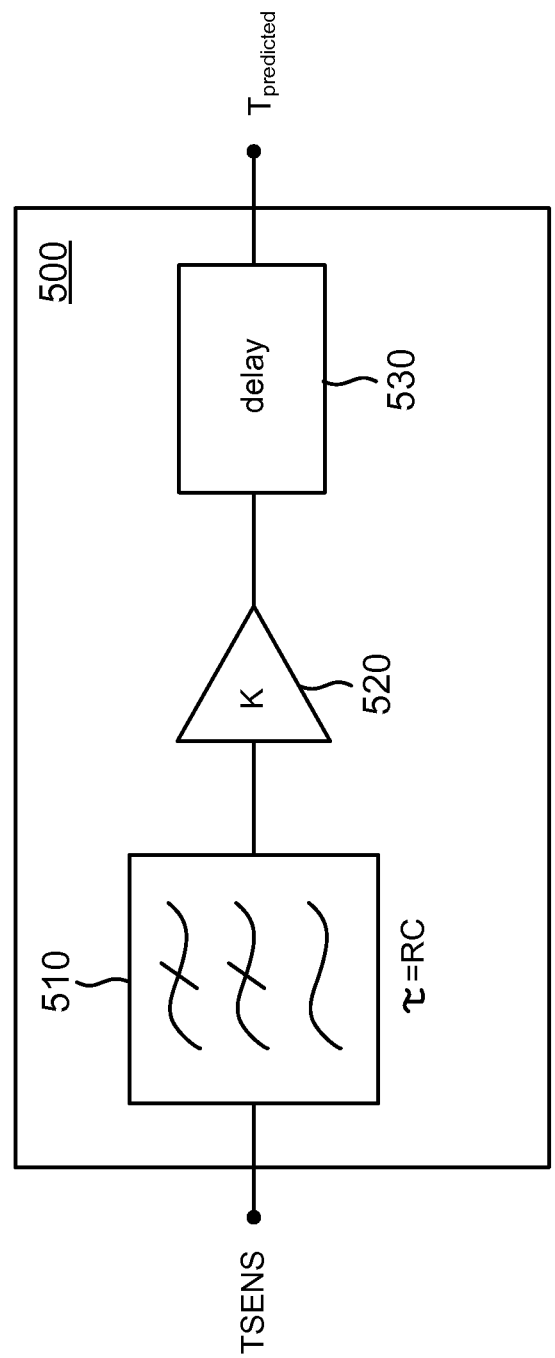
FIG. 5 is an illustration of an example processing logic to estimate device skin temperature from a temperature sensor reading, adapted according to one embodiment.

FIG. 4 is an illustration of example temperature curves 401-404 according to one embodiment. FIG. 5 is an illustration of an example processing functionality 500 including a transfer function to produce curve 404 as an output, given curve 401 as an input, according to one embodiment. Together, FIGS. 4 and 5 illustrate the concept of the transfer function that may be applied by thermal management unit 335 to calculate an estimated device skin temperature.

Looking at FIG. 4, curve 401 illustrates an example temperature measurement that is sensed by one of the thermal sensors 245a-c of FIG. 2. More specifically, curve 401 illustrates digital data produced by ADC 331 of FIG. 3 in response to electrical signals from thermal sensor 245. Of note is that curve 401 includes much fluctuation and rises fairly quickly. Examples of temperature fluctuations include those that occur due to the nature of processing in a computing device. For instance, as a user opens a video to watch the video and then pauses or stops the video, the SOC 230 may increase its amount of heat output as the video is playing and then decrease its amount of heat output as the video is paused or stopped. Additionally, opening and closing of various applications may result in temperature rises and drops.

In an instance where thermal sensor 245 is on SOC 230 (such as sensor 245a), it is expected that temperature fluctuations would be fairly quick and of relatively large magnitude. In an instance where thermal sensor 245 is in-package (such as sensor 245b), it is generally expected that the physical materials of the package would act as a low pass filter to smooth out the fluctuation somewhat, although some fluctuations may remain. This is even more true in an instance where thermal sensor 245 is separate from the package and is mounted to the printed circuit board 250 (such as sensor 245c), as the temperature sensor 245c would be separated from the heat of the SOC 230 by the physical materials of the package 240 and the printed circuit board 250.

FIG. 5 shows that processing functionality 500 receives the input TSENS, which in this example includes the digital temperature reading provided by ADC 331. Curve 401 is an example of TSENS. Curve 402 is an illustration of the effect of applying a low-pass filter to the curve 401. Specifically, the higher frequency fluctuations in curve 401 are filtered out, while the general direction of the curve is maintained. An example of a low pass filter includes filter 510 of FIG. 5. A designer may set the time constant τ of low pass filter 510 to be similar to the thermal low pass filter effects provided by the physical materials that make up the printed circuit board 250, package 240, and any other materials between SOC 230 and the outside surface of the device.

FIG. 5 also shows attenuation element 520, with a gain given by the constant K, wherein K is less than one. Curve 403 of FIG. 4 illustrates an example curve resulting from a low pass filter and then attenuation element being applied to curve 401. In many embodiments, it is expected that the physical materials that make up the printed circuit board 250, package 240, and any other materials between SOC 230 and the outside surface of the device would attenuate the heat from the SOC 230, such that the heat felt at the device skin would be less than the device that would be sensed at the SOC 230, the package 240, and/or the printed circuit board 250. A designer may set the value of K to be similar to the thermal attenuation properties of physical materials that make up the printed circuit board 250, package 240, and any other materials between SOC 230 and the outside surface of the device.

FIG. 5 further shows delay element 530. It is generally expected that in a physical system the heat produced by the SOC 230 would reach the device skin after some amount of delay, usually in the range of seconds or minutes. This delay effect is in addition to the low pass filter effects and attenuation effects, and the delay effect is also caused by the physical materials that make up the printed circuit board 250, package 240, and any other materials between SOC 230 and the outside surface of the device.

In the example of FIG. 4, curve 404 illustrates temperature data after a low pass filter, attenuation, and delay has been applied. Accordingly, curve 404 corresponds to Tpredicted of FIG. 5, and it may be used as an estimate of device skin temperature in the method of FIG. 6.

As noted above, the time constant of low-pass filter 510 (τ), gain constant of the attenuation element 520 (K), and the delay value of delay element 530 may be defined by the thermal conductive properties of the physical materials of the computing device 100. Specifically, the particular position of the temperature sensor 245, the presence or absence of a heat spreading device, and other thermal conductive properties of the device 100 define the transfer function that is applied to TSENS to calculate Tpredicted.

In some embodiments, the temperature threshold(s), τ, K, and delay value used by thermal management unit 335 may be design parameters that are known by simulation during the design phase of the device. In other embodiments, the temperature threshold(s), τ, K, and delay value may be determined through experimentation with a physical embodiment of the device. For instance, a computer-aided design program may be used by a designer to determine the heat conductive properties of the device as the device is being designed. Additionally or alternatively, a designer may take temperature readings of the skin of the device as well as readings from the various temperature sensors in a controlled environment in order to determine appropriate values for the temperature threshold(s), τ, K, and delay value. Such design and/or testing may be performed by a designer or manufacturer of the device.

In one example use case, a manufacturer or designer of a computing device determines one or more temperature thresholds, τ, K, and a delay value. The designer or manufacturer then saves that information into memory of SOC 230 for use by thermal management unit 335. This process is performed before delivering finished units to consumers, so that the finished product includes robust thermal mitigation functionality built into it. Additionally or alternatively, the transfer function applied by thermal management unit 335 to calculate an estimated skin temperature (Tpredicted) may be given as a third or fourth-order equation (or other appropriate function) taking a form similar to: Tpredicted=$a+bx+cx^2+dx^3$, where x is a variable associated with the sensed temperature, and the coefficients a, b, c, d are determined using one or more curve-fitting algorithms. In such examples, the coefficients a, b, c, d, and the variable x may be determined during the design phase and/or through experimentation, in a similar manner as described above with respect to the temperature threshold(s), τ, K, and delay value.

A flow diagram of an example method 600 of providing thermal mitigation is illustrated in FIG. 6. In one example, method 600 is performed by thermal management unit 335, such as described above with respect to FIG. 3. Method 600 assumes that the temperature threshold(s), τ, K, and delay value are already known for the particular device. Additionally or alternatively, method 600 assumes that the coefficients a, b, c, d and variable x are known for the particular device. Furthermore, various embodiments include the processor itself reading computer-executable code from a tangible computer-readable medium (e.g., RAM on the processor) and executing that code to perform the actions of method 600.

As the device operates during normal use, thermal management unit 335 performs the actions of method 600. Therefore, as a human user leaves the device idle, makes phone calls, sends text messages, watches videos, and the like, thermal management unit 335 continually performs the actions 600 to ensure that the device skin temperature does not reach a pre-defined uncomfortable level. It is noted in this example that a reading of temperature is taken at one or more temperature sensors (such as shown in FIG. 2), and the thermal mitigation processing (e.g., actions 602-607) is performed by logic at the SOC itself.

At action 602, the system reads the temperature data (TSENS in FIG. 5). For example, in the embodiment of FIG. 3, on-chip circuitry receives an electrical signal from a thermistor, shown as temperature sensor 245. The voltage or current at the thermistor is indicative of a resistance of the thermistor and, therefore, the temperature of the thermistor. In the embodiment of FIG. 3, the electrical signal from the thermistor is fed to an operational amplifier and then to an ADC, where the output of the ADC is a digital signal indicative of the temperature at the temperature sensor. The scope of embodiments is not limited to any particular temperature sensor. For instance, other embodiments may employ a temperature diode, a digital thermometer, a thermocouple, or other appropriate temperature sensor. Furthermore, the temperature sensor may be disposed at any appropriate position within the housing of the device.

At action 603, the system compares the temperature data to a programmed temperature threshold (Tsp). For instance, in the example of FIG. 3, thermal management unit 335 compares the temperature information against a programmed temperature threshold. The value of the temperature threshold may be any appropriate value, and it represents a temperature of the temperature sensor that is associated with a temperature limit of the device skin, such as a value at which it is expected that the device skin temperature may be nearing an uncomfortable or dangerous temperature. The value of the temperature threshold will depend on the heat conduction properties of the particular device. For instance, a device with a heat spreading layer built into it may be assigned a higher temperature threshold than a device that allows a more rapid heat transfer from the SOC to the skin. In some scenarios, the temperature threshold may be assigned to a device based upon experimentation and/or known heat transfer properties of the design. As noted above, the temperature threshold may be saved to memory in the processor of the device and accessed by thermal management unit 335 as it performs method 700.

If the value of the temperature data does not exceed the threshold, then the method 600 returns to action 602, wherein the system continues to read TSENS. However, if the value of the temperature data does exceed the threshold, then the system calculates an estimated skin temperature (Tpredicted). The system may calculate the estimated skin temperature according to the techniques described above with respect to FIGS. 4 and 5. Furthermore, the particular techniques used to calculate the estimated skin temperature may be device-dependent.

Furthermore, it is noted in this embodiment that the temperature data (TSENS) changes over time, and therefore, the comparison at action 603 and calculation at action 605 may change over time along with the temperature data.

At action 606, the system compares the estimated skin temperature (Tpredicted) to the threshold (Tsp). In the example of FIG. 6, the temperature threshold Tsp is shown to be the same threshold at actions 603 and 606. However, the scope of embodiments includes using different values for the temperature thresholds at actions 603 and 606. Furthermore, in this example, the threshold Tsp used in action 606 represents a maximum allowed temperature or other temperature limit of the external surface of the device (e.g., 40° C.). The maximum allowed temperature may be set by a designer or engineer in light of various factor, such as user comfort and safety.

If the estimated skin temperature does not exceed the temperature threshold, the method 600 returns to action 602, where the system reads TSENS. On the other hand, if the estimated skin temperature does exceed the threshold, the method 600 includes mitigating a performance of the processor chip in response to the estimated skin temperature and the threshold.

For instance, in the example of FIG. 3, thermal management unit 335 compares the estimated skin temperature to the programmed threshold. If the temperature information indicates that the temperature of the temperature sensor is greater than the threshold, then the thermal management unit 335 may reduce an operating parameter of the processor chip. An example of a processor chip is SOC 230 of FIG. 2, although the principles described herein may be applied to any appropriate computer processor.

Action 607 includes reducing an operating parameter of the processor chip. In one example, the thermal management unit 335 reduces an operating frequency of one or more cores in the SOC, thereby reducing power consumption. However, action 607 may include any appropriate thermal mitigation technique, such as putting cores in an idle state. For instance, in the example of FIG. 3, thermal management unit 335 may send commands to clock control unit 312 to reduce the clock frequency or gate the clock frequency altogether. In fact, reduction of any operating parameter, such as frequency or voltage, is within the scope of embodiments. The process continues to operate as the SOC operates, continually measuring the power consumption and taking appropriate mitigation steps according to the algorithm.

The scope of embodiments is not limited to the specific method shown in FIG. 6. Other embodiments may add, omit, rearrange, or modify one or more actions. For instance, method 600 may also include functionality to return the clock frequency to a previous level or otherwise to increase the clock frequency when thermal mitigation is no longer desired, such as after determining that the estimated skin temperature has decreased beyond the same or a different threshold. Also, various embodiments may include taking multiple temperature readings from various temperature sensors spread throughout the package and perhaps the SOC itself, as illustrated by sensors 245a-c in FIG. 2.

Various embodiments may provide one or more advantages over conventional solutions. For instance, it may be difficult to capture a temperature reading directly from the skin of a computing device, especially for more compact and mobile computing devices such as phones and tablets. Nevertheless, skin temperature can be very relevant to a user's perception of comfort. Some conventional solutions use temperature readings gathered from sensors on the processor chip and base thermal mitigation decisions on that temperature reading without further processing. But temperature readings gathered from thermal sensors on the processor may not provide an accurate indication of skin temperature, thereby causing intervention of a thermal mitigation process too early or too often and sacrificing performance of the system.

By contrast, the systems described herein provide thermal mitigation using estimated device skin temperatures. The estimation of device skin temperatures may be quite accurate and representative of true device skin temperature, if the parameters of the transfer function and threshold(s) are appropriately calculated during design and/or testing. Some embodiments described herein may improve the operation of a processor chip by allowing for more accurate thermal management, thereby providing comfort and safety for human users.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for mitigating temperature of a device, the method comprising:
   receiving a signal from a temperature sensor, wherein the temperature sensor is disposed within the device having a processor that produces heat within the device;
   generating temperature data from the signal;
   processing the temperature data to generate data indicative of a temperature of an external surface of the device, wherein
      the processing of the temperature data comprises:
      removing high-frequency variations;
      multiplicatively attenuating amplitudes using a factor that is less than one; and
      applying a delay; and
   reducing an operating parameter of the processor in response to determining that the indicated temperature of the external surface of the device is greater than a threshold temperature.

2. The method of claim 1, wherein the temperature sensor is disposed in at least one of the following locations within the device:
   in the processor;
   in a package including the processor, where the package includes a dielectric substrate on which the processor is mounted; and
   on a Printed Circuit Board (PCB) on which the package is disposed.

3. The method of claim 1, wherein the signal indicates a resistance associated with the temperature sensor.

4. The method of claim 1, wherein the temperature sensor comprises a thermistor.

5. The method of claim 1, wherein reducing the operating parameter of the processor comprises:
   comparing the indicated temperature of the external surface of the device to the threshold temperature, the threshold temperature representing a maximum allowed temperature of the external surface of the device.

6. The method of claim 1, wherein applying the delay comprises applying a delay value defined by the thermal conductive properties of the device.

7. The method of claim 1, wherein reducing an operating parameter of the processor comprises:
   reducing at least one of an operating frequency and an operating voltage of the processor.

8. The method of claim 1, further comprising:
   subsequently increasing the operating parameter of the processor in response to determining that the indicated temperature of the external surface of the device has decreased below a second threshold temperature.

9. A computer program product having a computer readable medium tangibly recording computer program logic for mitigating temperature of a device, the computer program product comprising:
   code to receive a signal from a temperature sensor, wherein the temperature sensor is disposed within the device having a processor that produces heat within the device,
   code to generate temperature data from the signal;
   code to remove high-frequency variations to multiplicatively attenuate amplitudes using a factor that is less than one, and to apply a delay, to generate data indicative of a temperature of an external surface of the device; and
   code to reduce an operating parameter of the processor in response to determining that the indicated temperature of the external surface of the device is greater than a threshold temperature.

10. The computer program product of claim 9, wherein the code to reduce the operating parameter of the processor comprises:
    code to reduce at least one of an operating frequency and an operating voltage of the processor.

11. The computer program product of claim 9, wherein the code to reduce the operating parameter of the processor comprises:
    code to compare the indicated temperature of the external surface of the device to the threshold temperature, the threshold temperature representing a maximum allowed temperature of the external surface of the device.

12. The computer program product of claim 9, further comprising:
    code to subsequently increase the operating parameter of the processor in response to determining that the indicated temperature of the external surface of the device has decreased below a second threshold temperature.

13. The computer program product of claim 9, wherein the signal indicates a resistance associated with the temperature sensor.

14. A system for mitigating temperature, the system comprising:
    a processor;
    a housing configured to enclose at least a portion of the system, the processor being disposed within the system so that it is enclosed within the housing, the processor further being in indirect thermal contact with the housing; and a temperature sensing device disposed within the housing, the temperature sensing device being in electrical communication with the processor, the processor configured to perform the following operations:

generate first temperature data indicative of a temperature experienced by the temperature sensing device;

estimate a temperature of an external surface of the housing by generating second temperature data, wherein generating second temperature data includes: applying a transfer function to the first temperature data, the transfer function including removing high-frequency variations, multiplicatively attenuating amplitudes using a factor that is less than one, and applying a delay; and reduce an operating parameter of the processor in response to determining that the generated second temperature is greater than a threshold temperature.

15. The system of claim 14, wherein the computer processor is configured to receive electrical signals from the temperature sensing device and to generate the first digital temperature data from the electrical signals.

16. The system of claim 14, wherein the temperature sensing device is disposed in at least one of the following locations within the system:

in the computer processor;

in a package including the computer processor, where the package includes a dielectric substrate on which the computer processor is mounted; and on a Printed Circuit Board (PCB) on which the package is disposed.

17. The system of claim 14, wherein the temperature sensing device comprises a thermistor.

18. The system of claim 14, wherein the operating parameter comprises at least one of an operating frequency of the computer processor and an operating voltage of the computer processor.

19. The system of claim 14, wherein the computer processor is implemented in a system on chip (SOC) within a package, wherein the package includes a dielectric substrate mechanically coupled to the SOC, further wherein the package is mounted to a printed circuit board and disposed within the physical housing.

20. The system of claim 19, wherein the system comprises at least one of a smart phone and a tablet computer.

21. The system of claim 19, wherein the external surface comprises a liquid crystal display (LCD) surface.

22. A system for mitigating temperature, the system comprising:

means for providing information indicating a temperature internal to an enclosed computing device;

means for estimating a temperature of an external surface of the computing device by multiplicatively attenuating amplitudes using a factor less than one, removing high-frequency variations, and applying a delay, to the information indicating the temperature internal to the enclosed computing device and for producing a control signal based on an estimated temperature of the external surface of the computing device;

means for reducing an operating parameter of the means for estimating in response to determining that the control signal indicates that the temperature of the external surface is greater than a threshold temperature; and a physical housing that includes the external surface of the computing device and configured to enclose the means for estimating, wherein the means for estimating is in indirect thermal contact with the physical housing.

23. The system of claim 22, wherein the means for providing information comprises a thermistor that is disposed in at least one of the following locations within the device:

in the means for estimating;

in a package including the means for estimating, where the package includes a dielectric substrate on which the means for estimating is mounted; and on a Printed Circuit Board (PCB) on which the package is disposed.

24. The system of claim 22, wherein the means for reducing the operating parameter comprises a clock controller.

25. The system of claim 22, wherein the means for estimating the temperature comprises a computer processor implemented as a system on a chip.

* * * * *